US010186081B2

United States Patent
Taylor et al.

(10) Patent No.: US 10,186,081 B2
(45) Date of Patent: Jan. 22, 2019

(54) TRACKING RIGGED SMOOTH-SURFACE MODELS OF ARTICULATED OBJECTS

(71) Applicant: Microsoft Technology Licensing, LLC, Redmond, WA (US)

(72) Inventors: Jonathan James Taylor, London (GB); Thomas Joseph Cashman, Cambridge (GB); Andrew William Fitzgibbon, Cambridge (GB); Toby Sharp, Cambridge (GB); Jamie Daniel Joseph Shotton, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 14/982,878

(22) Filed: Dec. 29, 2015

(65) Prior Publication Data

US 2017/0186165 A1    Jun. 29, 2017

(51) Int. Cl.
| | | |
|---|---|---|
| G06T 7/00 | (2017.01) | |
| G06T 17/20 | (2006.01) | |
| G06T 7/73 | (2017.01) | |
| G06T 7/246 | (2017.01) | |

(52) U.S. Cl.
CPC ............ *G06T 17/205* (2013.01); *G06T 7/251* (2017.01); *G06T 7/75* (2017.01); *G06T 2207/10028* (2013.01); *G06T 2207/20081* (2013.01); *G06T 2207/30196* (2013.01)

(58) Field of Classification Search
CPC .......... G06T 17/205; G06T 7/75; G06T 7/251
See application file for complete search history.

(56) References Cited

U.S. PATENT DOCUMENTS

| | | |
|---|---|---|
| 5,454,043 A | 9/1995 | Freeman |
| 6,128,003 A | 10/2000 | Smith et al. |
| 6,788,809 B1 | 9/2004 | Grzeszczuk et al. |
| 7,702,130 B2 | 4/2010 | Im et al. |
| 8,154,524 B2 | 4/2012 | Wilson et al. |
| 8,351,646 B2 | 1/2013 | Fujimura et al. |
| 8,428,311 B2 | 4/2013 | Dariush et al. |
| 8,576,253 B2 | 11/2013 | Wilson |
| 8,610,723 B2 | 12/2013 | Lee et al. |
| 8,682,028 B2 | 3/2014 | Geiss |
| 8,717,318 B2 | 5/2014 | Anderson et al. |
| 8,718,327 B2 | 5/2014 | Tong et al. |
| 8,774,464 B2 | 7/2014 | Adhikari |

(Continued)

OTHER PUBLICATIONS

Allen, et al., "The Space of Human Body Shapes: Reconstruction and Parameterization from Range Scans", In Journal of ACM Transactions on Graphics, vol. 22, Issue 3, Jul. 2003, pp. 587-594.

(Continued)

*Primary Examiner* — Kim Vu
*Assistant Examiner* — Molly Delaney (57) ABSTRACT

A tracker is described which comprises an input configured to receive captured sensor data depicting an object. The tracker has a processor configured to access a rigged, smooth-surface model of the object and to compute values of pose parameters of the model by calculating an optimization to fit the model to data related to the captured sensor data. Variables representing correspondences between the data and the model are included in the optimization jointly with the pose parameters.

20 Claims, 5 Drawing Sheets

(56) References Cited

U.S. PATENT DOCUMENTS

| | | | |
|---|---|---|---|
| 8,781,221 B2 | 7/2014 | Ding et al. | |
| 8,797,328 B2 | 8/2014 | Corazza et al. | |
| 8,887,074 B2 | 11/2014 | Sheeler et al. | |
| 9,098,926 B2 | 8/2015 | Quan et al. | |
| 9,117,113 B2 | 8/2015 | Popa et al. | |
| 2004/0236541 A1 | 11/2004 | Kramer et al. | |
| 2008/0231926 A1 | 9/2008 | Klug | |
| 2009/0154796 A1* | 6/2009 | Gupta | G06K 9/00348 382/159 |
| 2009/0175540 A1* | 7/2009 | Dariush | G06K 9/00362 382/195 |
| 2009/0252423 A1* | 10/2009 | Zhu | G06K 9/00201 382/209 |
| 2009/0284529 A1* | 11/2009 | De Aguiar | G06T 13/40 345/420 |
| 2010/0053151 A1 | 3/2010 | Marti et al. | |
| 2012/0078614 A1 | 3/2012 | Galor et al. | |
| 2012/0113140 A1 | 5/2012 | Hilliges et al. | |
| 2012/0117514 A1 | 5/2012 | Kim et al. | |
| 2012/0212509 A1 | 8/2012 | Benko et al. | |
| 2012/0218262 A1 | 8/2012 | Yomdin et al. | |
| 2012/0327089 A1 | 12/2012 | Lee et al. | |
| 2013/0088439 A1 | 4/2013 | Shih et al. | |
| 2013/0107003 A1 | 5/2013 | Lim et al. | |
| 2013/0129230 A1* | 5/2013 | Shotton | G06K 9/00214 382/218 |
| 2014/0072175 A1* | 3/2014 | Hasler | G06K 9/00536 382/103 |
| 2014/0088941 A1 | 3/2014 | Banerjee et al. | |
| 2014/0104274 A1 | 4/2014 | Hilliges et al. | |
| 2014/0219550 A1 | 8/2014 | Popa et al. | |
| 2014/0232631 A1 | 8/2014 | Fleischmann et al. | |
| 2015/0193975 A1 | 7/2015 | Corazza et al. | |
| 2015/0256815 A1 | 9/2015 | Grafulla-Gonzalez | |
| 2017/0185141 A1 | 6/2017 | Shotton et al. | |
| 2017/0186226 A1 | 6/2017 | Cashman et al. | |
| 2018/0182166 A1 | 6/2018 | Shen et al. | |

OTHER PUBLICATIONS

Anguelov, et al., "SCAPE: Shape Completion and Animation of People", In Journal of ACM Transactions on Graphics, vol. 24, Issue 3, Jul. 2005, pp. 408-416.

Ballan, et al., "Motion Capture of Hands in Action using Discriminative Salient Points", In Proceedings of 12th European Conference on Computer Vision, Oct. 7, 2012, pp. 1-14.

Blanz, et al., "A Morphable Model for the Synthesis of 3D Faces", In Proceedings of 26th Annual Conference on Computer Graphics and Interactive Techniques, Aug. 8, 1999, pp. 187-194.

Cashman, et al., "What Shape Are Dolphins? Building 3D Morphable Models from 2D Images", In Journal of IEEE Transactions on Pattern Analysis and Machine Intelligence, vol. 35, Issue 1, Jan. 2013, pp. 232-244.

Gorge, et al., "Model-Based Hand Tracking with Texture, Shading and Self-occlusions", In Proceedings of IEEE Conference on Computer Vision and Pattern Recognition, Jun. 2008, 8 pages.

Hasler, et al., "A Statistical Model of Human Pose and Body Shape", In Proceedings of 30th Annual Conference of the European Association for Computer Graphics, vol. 28, No. 2, Mar. 30, 2009, pp. 1-10.

Helten, et al., "Personalization and Evaluation of a Real-time Depth-based Full Body Tracker", In Proceedings of International Conference on 3D Vision, Jun. 29, 2013, 8 pages.

Hirshberg, et al., "Coregistration: Simultaneous Alignment and Modeling of Articulated 3D Shape", In Proceedings of 12th European Conference on Computer Vision, Oct. 7, 2013, pp. 242-255.

Agarwal, et al., "Ceres Solver", Retrieved on: Oct. 7, 2015, 2 pages. Available at: http://ceres-solver.org/.

Igarashi, et al., "As-Rigid-as-Possible Shape Manipulation", In Journal ACM Transactions on Graphics, vol. 24, Issue 3, Jul. 31, 2005, pp. 1134-1141.

Izadi, et al., "KinectFusion: Real-time 3D Reconstruction and Interaction Using a Moving Depth Camera", In Proceedings of the 24th annual ACM symposium on User interface software and technology, Oct. 16, 2011, pp. 559-568.

Jacobson, et al., "Stretchable and Twistable Bones for Skeletal Shape Deformation", In Journal ACM Transactions on Graphics, vol. 30, Issue 6, Dec. 2011, 8 pages.

Keskin, et al., "Hand Pose Estimation and Hand Shape Classification using Multi-Layered Randomized Decision Forests", In Proceedings of the 12th European conference on Computer Vision—vol. Part VI, Oct. 07, 2012, 1 p.

Li, et al. "Robust Single-View Geometry and Motion Reconstruction", In Journal ACM Transactions on Graphics, vol. 28, issue 5, Dec. 17, 2009, 10 pages.

Li, et al. "Global Correspondence Optimization for Non-Rigid Registration of Depth Scans", In Proceedings of the Eurographics Symposium on Geometry Processing, vol. 27, Issue 5, Jul. 2, 2008, 10 pages.

Li, et al., "3D Self-Portraits", In Journal ACM Transactions on Graphics, vol. 32, Issue 6, Nov. 2013, 9 pages.

Liao, et al., "Modeling Deformable Objects from a Single Depth Camera", In Proceedings of IEEE 12th International Conference on Computer Vision, Sep. 29, 2009, pp. 167-174.

Loop, et al., "Approximating Catmull-Clark Subdivision Surfaces with Bicubic Patches", In Journal ACM Transactions on Graphics, vol. 27, Issue 1, Mar. 2008, 11 pages.

Newcombe, et al., "DTAM: Dense Tracking and Mapping in Real-Time", In Proceedings of IEEE International Conference on Computer Vision, Nov. 6, 2011, pp. 2320-2327.

Rhee, et al., "Human Hand Modeling from Surface Anatomy", In Proceedings of the symposium on Interactive 3D graphics and games, Mar. 14, 2006, 9 pages.

Sorkine, et al., "As-Rigid-as-Possible Surface Modeling", In Proceedings of the fifth Eurographics symposium on Geometry processing, Jul. 4, 2007, 8 pages.

Sorkine, et al., "Laplacian Surface Editing", In Proceedings of the Eurographics/ACM SIGGRAPH symposium on Geometry processing, Jul. 8, 2004, pp. 175-184.

Stoll, et al., "Template Deformation for Point Cloud Fitting", In Proceedings of the 3rd Eurographics / IEEE VGTC conference on Point-Based Graphics, Jul. 29, 2006, 9 pages.

Straka, et al., "Simultaneous Shape and Pose Adaption of Articulated Models using Linear Optimization", In Proceedings of the 12th European conference on Computer Vision—vol. Part I, Oct. 27, 2012, pp. 1-14.

Sumner, et al., "Embedded Deformation for Shape Manipulation", In Journal of ACM Transactions on Graphics, vol. 26 Issue 3, Jul. 2007, 8 pages.

Taylor, et al., "The Vitruvian Manifold: Inferring Dense Correspondences for One-Shot Human Pose Estimation", In Proceedings of IEEE Conference on Computer Vision and Pattern Recognition, Jun. 16, 2012, pp. 103-110.

Triggs, et al., "Bundle Adjustment—A Modern Synthesis", In Proceedings of International Workshop on Vision Algorithms: Theory and Practice, Sep. 2000, pp. 1-71.

Wand, et al., "Efficient Reconstruction of Nonrigid Shape and Motion from Real-Time 3D Scanner Data", In Journal of ACM Transactions on Graphics, vol. 28, Issue 2, Apr. 2009, 15 pages.

Weiss, et al., "Home 3D Body Scans from Noisy Image and Range Data", In Proceedings of IEEE International Conference on Computer Vision, Nov. 6, 2011, pp. 1951-1958.

Khamis, et al., "Learning an Efficient Model of Hand Shape Variation from Depth Images", In Proceedings of Computer Vision and Pattern Recognition, Jun. 7, 2015, 9 pages.

Sharpy, et al., "Accurate, Robust, and Flexible Real-time Hand Tracking", In Proceedings of the 33rd Annual ACM Conference on Human Factors in Computing Systems, Apr. 18, 2015, 10 pages.

Wang, et al., "An Adjustable Polygon Connecting Method for 3D Mesh Refinement", In Proceedings of International Conference on Virtual Reality and Visualization, Aug. 30, 2014, pp. 202-207.

Schmidt, et al., "DART: Dense Articulated Real-Time Tracking", In Journal of Autonomous Robots, vol. 39, Issue 3, Oct. 2015, 9 pages.

(56) References Cited

OTHER PUBLICATIONS

Dewaele, et al., "Hand Motion from 3D Point Trajectories and a Smooth Surface Model", In Proceedings of 8th European Conference on Computer Vision, May 11, 2004, pp. 495-507.
Xu, et al., "Estimate Hand Poses Efficiently from Single Depth Images", In International Journal of Computer Vision, Apr. 19, 2015, 25 pages.
Qian, et al., "Realtime and Robust Hand Tracking from Depth", In Proceedings of IEEE Conference on Computer Vision and Pattern Recognition, Jun. 23, 2014, pp. 1106-1113.
"How to apply Subdivision Surface for fluent bone animation", Published on: Apr. 29, 2014, 3 pages available at: http://blender.stackexchange.com/questions/8341/how-to-apply-subdivision-surface-for-fluent-bone-animation.
"Leap Motion for Mac and PC", Available at: https://www.leapmotion.com/, Oct. 8, 2015, 5 Pages.
"Poser 3D Animation Software", Available at: https://mysmithmicro.com/poser-3d-animation-software.html, Oct. 8, 2015, 2 Pages.
"Final Office Action Issued in U.S. Appl. No. 14/982,568", dated Jan. 9, 2018, 31 Pages.
"Non Final Office Action Issued in U.S. Appl. No. 14/982,568", dated Jun. 27, 2017, 27 Pages.
"Final Office Action Issued in U.S. Appl. No. 14/982,911", dated Jun. 2, 2017, 8 Pages.
"Final Office Action Issued in U.S. Appl. No. 14/982,911", dated Mar. 19, 2018, 10 Pages.
"Non Final Office Action Issued in U.S. Appl. No. 14/982,911", dated Nov. 27, 2017, 9 Pages.
"Non Final Office Action Issued in U.S. Appl. No. 14/982,911", dated Feb. 8, 2017, 10 Pages.
Albrecht, et al., "Construction and Animation of Anatomically Based Human Hand Models", In Proceedings of the ACM SIGGRAPH/Eurographics symposium on Computer animation, Jul. 26, 2003, pp. 98-109.
Alexander, et al., "Proportions of Hand Segments", In International Journal of Morphology, vol. 28, Issue 3, Jan. 1, 2010, pp. 755-758.
Allen, et al., "Articulated Body Deformation from Range Scan Data", In Journal of ACM Transactions on Graphics, vol. 21, Issue 3, Jul. 23, 2002, pp. 612-619.
Athitsos, et al., "Estimating 3D hand pose from a cluttered image", In Proceedings of IEEE Computer Society Conference on Computer Vision and Pattern Recognition, Jun. 16, 2003, 8 Pages.
Bergh, et al., "Combining RGB and ToF Cameras for Real-Time 3D Hand Gesture Interaction", 2011 IEEE Workshop on Applications of Computer Vision (WACV), Jan. 5, 2011, 7 Pages.
Bogo, et al., "Detailed Body Shape and Pose from RGB-D Sequences", In Proceedings of International Conference on Computer Vision, Oct. 25, 2015, 2 Pages.
Bray, et al., "Smart Particle Filtering for 3D Hand Tracking", In Proceedings of the Sixth IEEE International Conference on Automatic Face and Gesture Recognition, May 17, 2004, 6 Pages.
Chen, et al., "Tensor-Based Human Body Modeling", In Proceedings of the IEEE Conference on Computer Vision and Pattern Recognition, Jun., 2013, pp. 105-112.
Criminis, et al., "Decision Forests in Computer Vision and Medical Image Analysis", In Book Decision Forests for Computer Vision and Medical Image Analysis, Springer, Feb. 7, 2013, 3 Pages.
Dipietro, et al., "A Survey of Glove-Based Systems and their Applications", In IEEE Transactions on Systems, Man, and Cybernetics, Part C: Applications and Reviews, vol. 38, Issue 4, Jul. 2008, 22 Pages.
Duan, et al., "HapticFlow: PDE-Based Mesh Editing with Haptics", In Journal of Computer Animation and Virtual Worlds, vol. 15, Issue 3-4, Jul. 2004, 8 Pages.
Erol, et al., "Vision-based Hand Pose Estimation: A review", In Proceedings of Computer Vision and Image Understanding 108, Oct. 2007, 22 Pages.
Fanello, et al., "Learning to be a Depth Camera for Close-Range Human Capture and Interaction", In Proceedings of the ACM Transactions on Graphics, vol. 33, No. 4, Jul. 27, 2014, 11 Pages.

Freifeld, et al., "Lie Bodies: A Manifold Representation of 3D Human Shape", In Proceedings of the 12th European Conference on Computer Vision, Oct. 7, 2012, pp. 1-14.
Girshick, et al., "Efficient Regression of General-Activity Human Poses from Depth Images", In Proceedings of the International Conference on Computer Vision, Nov. 6, 2011, 8 Pages.
Gorce, et al., "Model-based 3D Hand Pose Estimation from Monocular Video", In IEEE Transactions on Pattern Analysis and Machine Intelligence, vol. 33, Issue 9, Sep. 2011, 14 Pages.
Heap, et al., "Towards 3D Hand Tracking using a Deformable Model", In Proceedings of the Second International Conference on Automatic Face and Gesture Recognition, Oct. 14, 1996, 6 Pages.
Hilliges, et al., "HoloDesk: Direct 3D Interactions with a Situated See-Through Display", In Proceedings of the SIGCHI Conference on Human Factors in Computing Systems, May 5, 2012, pp. 2421-2430.
Juang, Chia-Feng, "A Hybrid of Genetic Algorithm and Particle Swarm Optimization for Recurrent Network Design", In Proceedings of the IEEE Transactions on Systems, Man, and Cybernetics-Part B: Cybernetics, vol. 34, Issue 2, Apr. 2004, 10 Pages.
Kanzow, et al., "Levenberg-Marquardt Methods with Strong Local Convergence Properties for Solving Nonlinear Equations with Convex Constraints", In Journal of Computational and Applied Mathematics, vol. 172, Issue 2, Jan. 15, 2005, pp. 375-397.
Keskin, et al., "Real Time Hand Pose Estimation using Depth Sensors", In Chapter on Consumer Depth Cameras for Computer Vision, Nov. 6, 2011, pp. 1228-1234.
Kim, et al., "Digits: Freehand 3D Interactions anywhere using a Wrist-Worn Gloveless Sensor", In Proceedings of the 25th Annual ACM Symposium on User Interface Software and Technology, Oct. 7, 2012, pp. 167-176.
Kim, "Haptic Feedback Design for a Virtual Button Along Force-Displacement Curves", In Proceedings of the 6th annual ACM symposium on User interface software and technology, Oct. 8, 2013, 6 Pages.
Krupka, et al., "Discriminative Ferns Ensemble for Hand Pose Recognition", In Proceedings of the IEEE Conference on Computer Vision and Pattern Recognition, Jun. 23, 2014, 8 Pages.
Lin, et al. "Human Hand Gesture Recognition using a Convolution Neural Network", In Proceedings of International Conference on Automation Science and Engineering, Aug. 18, 2014, pp. 1038-1043.
Loop, Charles Teorell., "Smooth Subdivision Surfaces Based on Triangles", In Master's thesis, University of Utah, Department of Mathematics, Aug. 1987, 74 Pages.
Loper, et al., "OpenDR: An Approximate Differentiable Renderer", In European Conference on Computer Vision, Jan. 1, 2014, pp. 154-169.
Loper, et al., "SMPL: A Skinned Multi-Person Linear Model", In Proceedings of ACM SIGGRAPH, vol. 34, Issue 3, Nov. 4, 2015, 15 Pages.
Makris, et al., "Model-Based 3D Hand Tracking with On-Line Shape Adaptation", In Proceedings of the British Machine Vision Conference, Sep. 7, 2015, 12 Pages.
Marin, et al., "Hand Gesture Recognition with Jointly Calibrated Leap Motion and Depth Sensor", In Journal of Multimedia Tools and Applications, Feb. 13, 2015, 11 Pages.
Melax, et al., "Dynamics Based 3D Skeletal Hand Tracking", In Proceedings of Graphics Interface, May 29, 2013, 8 Pages.
Mo, et al., "Real-time Hand Pose Recognition Using Low-Resolution Depth Images", In Proceedings of the IEEE Computer Society Conference on Computer Vision and Pattern Recognition, vol. 2, Jun. 17, 2006, 7 Pages.
Neumann, et al., "Capture and Statistical Modeling of Arm—Muscle Deformations", In Proceedings of Computer Forum, vol. 32, Issue 2, May 6, 2013, pp. 285-294.
Oberweger, et al., "Hands Deep in Deep Learning for Hand Pose Estimation", In Proceeding of 20th Computer Vision Winter Workshop, Feb. 9, 2015, 10 Pages.
Oberweger, "Training a Feedback Loop for Hand Pose Estimation", In Proceedings of International Conference on Computer Vision, Dec. 7, 2015, 9 Pages.

(56) References Cited

OTHER PUBLICATIONS

Oikonomidis, et al., "Efficient Model-Based 3D Tracking of Hand Articulations using Kinect", In Proceedings of British Machine Vision Conference, Aug. 29, 2011, pp. 1-11.

Oikonomidis, et al., "Full DOF Tracking of a Hand Interacting with an Object by Modeling Occlusions and Physical Constraints", In Proceedings of the IEEE International Conference on Computer Vision, Nov. 6, 2011, 8 Pages.

Oikonomidis, et al., "Tracking the Articulated Motion of Two Strongly Interacting Hands", In Proceedings IEEE Conference on the Computer Vision and Pattern Recognition, Jun. 16, 2012, 8 Pages.

"International Preliminary Report on Patentability Issued in PCT Application No. PCT/US2016/067641", dated Oct. 31, 2017, 10 Pages.

"International Search Report and Written Opinion Issued in PCT Application No. PCT/US2016/067641", dated Mar. 31, 2017, 12 Pages.

"Second Written Opinion Issued in PCT Application No. PCT/US2016/067641", dated Jul. 28, 2017, 4 Pages.

"International Search Report and Written Opinion Issued in PCT Application No. PCT/US2016/067643", dated Apr. 21, 2017, 11 Pages.

Poier, et al., "Hybrid One-Shot 3D Hand Pose Estimation by Exploiting Uncertainties", In Proceedings of 26th British Machine Vision Conference, Oct. 27, 2015, pp. 1-14.

Ren, et al., "Depth Camera Based Hand Gesture Recognition and its Applications in Human-Computer-Interaction", In Proceedings of 8th International Conference on Information, Communications and Signal Processing, Dec. 13, 2011, 5 Pages.

Shotion, et al., "Decision Jungles: Compact and Rich Models for Classification", In Proceedings of Advances in Neural Information Processing Systems, Dec. 5, 2013, pp. 1-9.

Shotton, et al., "Real-Time Human Pose Recognition in Parts from Single Depth Images", In Proceedings of the IEEE Conference on Computer Vision and Pattern Recognition, Jun. 21, 2011, 8 Pages.

Sridhar, et al., "Fast and Robust Hand Tracking Using Detection-Guided Optimization", In Proceedings of Computer Vision and Pattern Recognition, Jun. 7, 2015, pp. 3213-3221.

Sridhar, "Interactive Markerless Articulated Hand Motion Tracking using RGB and Depth Data", In Proceedings of IEEE International Conference on Computer Vision, Dec. 3, 2013, 8 Pages.

Sridhar, et al., "Real-time Hand Tracking Using a Sum of Anisotropic Gaussians Model", In Proceedings of International Conference on 3D Vision, Dec. 8, 2014, 8 Pages.

Stenger, et al., "Model-Based 3D Tracking of an Articulated Hand", In Proceedings of IEEE Computer Society Conference on Computer Vision and Pattern Recognition, Dec. 8, 2001, 6 Pages.

Sun, et al., "Conditional Regression Forests for Human Pose Estimation", In Proceedings of IEEE Conference on Computer Vision and Pattern Recognition, Jun. 16, 2012, 8 Pages.

Supancic, et al., "Depth-based Hand Pose Estimation: Data, Methods, and Challenges", In Proceedings of International Conference Computer Vision, Nov. 30, 2015, 15 Pages.

Suryanarayan, et al., "Dynamic Hand Pose Recognition using Depth Data", In Proceedings of 20th International Conference on Pattern Recognition, Aug. 23, 2010, pp. 3105-3108.

Tagliasacchi, et al., "Robust Articulated-ICP for Real-Time Hand Tracking", In Proceedings of Eurographics Symposium on Geometry Processing, vol. 34, No. 5, Aug. 6, 2015, 14 Pages.

Tan, et al., "Fits Like a Glove: Rapid and Reliable Hand Shape Personalization", In Proceedings of the IEEE Conference on Computer Vision and Pattern Recognition, Jun. 27, 2016, pp. 5610-5619.

Tang, et al., "Latent Regression Forest: Structured Estimation of 3D Articulated Hand Posture", In Proceedings of IEEE Conference on Computer Vision and Pattern Recognition, Jun. 9, 2014, pp. 3786-3793.

Tang, et al., "Opening the Black Box: Hierarchical Sampling Optimization for Estimating Human Hand Pose", In Proceedings of International Conference on Computer Vision, Nov. 30, 2015, 9 Pages.

Tang, et al., "Real-Time Articulated Hand Pose Estimation using Semi-Supervised Transductive Regression Forests", In Proceedings of IEEE International Conference on Computer Vision, Dec. 3, 2013, pp. 3224-3231.

Tang, Matihew, "Recognizing Hand Gestures with Microsoft's Kinect", In Palo Alto: Department of Electrical Engineering of Stanford University, Mar. 16, 2011, 12 Pages.

Taylor, et al., "User-Specific Hand Modeling from Monocular Depth Sequences", In IEEE Conference on Computer Vision and Pattern Recognition, Jun. 24, 2014, 8 Pages.

Tompson, et al., "Real-Time Continuous Pose Recovery of Human Hands Using Convolutional Networks", In Journal of ACM Transactions on Graphics, vol. 33, Issue 5, Sep. 23, 2014, 10 Pages.

Tsoli, et al., "Breathing Life into Shape: Capturing, Modeling and Animating 3D Human Breathing", In Journals of ACM Transactions on Graphics, vol. 33, Issue 4, Jul. 27, 2014, 11 Pages.

Vicente, et al., "GPU-Enabled Particle Based Optimization for Robotic-Hand Pose Estimation and Self-Calibration", In Proceedings of IEEE International Conference on Autonomous Robot Systems and Competitions, Apr. 8, 2015, pp. 3-8.

Wang, et al., "6D Hands: Markerless Hand-Tracking for Computer Aided Design", In Proceedings of the 24th Annual ACM Symposium on User Interface Software and Technology, Oct. 16, 2011, pp. 549-557.

Wang, et al., "Data-driven Glove Calibration for Hand Motion Capture", In Proceedings of the 12th ACM SIGGRAPH/Eurographics Symposium on Computer Animation, Jul. 19, 2013, 10 Pages.

Wang, et al., "Real-Time Hand-Tracking with a Color Glove", Proceedings of ACM Transactions on Graphics, vol. 28, Issue 3, Jul. 27, 2009, 8 Pages.

Wang, et al., "Video-Based Hand Manipulation Capture through Composite Motion Control", In Proceedings of ACM Transactions on Graphics, vol. 32, Issue 4, Jul. 21, 2013, 14 Pages.

Wu, et al., "Capturing Natural Hand Articulation", In Proceedings of the 8th International Conference on Computer Vision, vol. 2, Jul. 7, 2001, pp. 426-432.

Wu, et al., "View-Independent Recognition of Hand Postures", In Proceedings of IEEE Conference on Computer Vision and Pattern Recognition, Jun. 15, 2000, 7 Pages.

Xu, et al., "Efficient Hand Pose Estimation from a Single Depth Image", In Proceedings of the IEEE International Conference on Computer Vision, Dec. 1, 2013, pp. 3456-3462.

Yu, et al., "The Haptic Feedback Design of Augmented Reality Virtual Keyboard on the Air", In Proceedings of 8th International Conference on Universal Access in Human-Computer Interaction, Jun. 22, 2014, 5 Pages.

Yuille, et al., "Vision as Bayesian Inference: Analysis by Synthesis?", In Proceedings of Trends in Cognitive Sciences, vol. 10, Issue 7, Jul. 1, 2006, 8 Pages.

Zhao, et al., "Combining Markerbased Mocap and RGB-D Camera for Acquiring High-Fidelity Hand Motion Data", In Proceedings of the ACM SIGGRAPH/Eurographics Symposium on Computer Animation, Jul. 29, 2012, pp. 33-42.

Zibreg, Christian, "Apple patent outlines virtual Mac keyboard with haptic feedback", Available at: http://www.downloadblog.com/2015/03/19/apple-patent-mac-keyboard-haptic/, Mar. 19, 2015, 6 Pages.

"Non Final Office Action Issued in U.S. Appl. No. 14/982,911", dated Aug. 13, 2018, 9 Pages.

* cited by examiner

TRACKING RIGGED SMOOTH-SURFACE MODELS OF ARTICULATED OBJECTS

BACKGROUND

Articulated objects such as the human body, human hand, a laptop computer, a robot, an animal, or other articulated object, are challenging to track with high levels of accuracy and speed from captured sensor data such as video images, depth camera images and other sensor data. Tracking such articulated objects involves calculating the global position and orientation of the object as well as tracking positions and orientations of one or more joints of the articulated entity. For example, a joint where a laptop display connects to a keyboard, a finger joint of a human hand and others.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A tracker is described which comprises an input configured to receive captured sensor data depicting an object. The tracker has a processor configured to access a rigged, smooth-surface model of the object and to compute values of pose parameters of the model by calculating an optimization to fit the model to data related to the captured sensor data. Variables representing correspondences between the data and the model are included in the optimization jointly with the pose parameters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example is constructed or utilized. The description sets forth the functions of the example and the sequence of operations for constructing and operating the example. However, the same or equivalent functions and sequences are optionally accomplished by different examples.

Apparatus which calculates pose parameters of an articulated object in a faster and more accurate manner than previously possible is described. For example the articulated object is any of: a human hand, the human head and shoulders, the human body, all or part of an animal body, a laptop computer, a robot, or other articulated object. The ability to calculate pose parameters of a rigged smooth-surface model of the object in a faster and/or more accurate manner is achieved through use of an optimization process. The optimization process fits the model to data related to captured sensor data of the object. Variables representing correspondences between the data and the model are included in the optimization jointly with the pose parameters. This enables correspondence estimation and model fitting to be unified.

A rigged model is one which has an associated representation of one or more joints of the articulated object, such as a skeleton. In various examples in this document a smooth surface model is one where the surface of the model is substantially smooth rather than having many sharp edges or discontinuities; it has isolated nearly smooth edges in some examples. In other words, a smooth surface model is one where derivatives of the surface do not change substantially anywhere on the surface. This enables a gradient based optimizer to operate as described in more detail below. A sharp edge is one in which the rate of change of surface position or orientation changes substantially from one side of the edge to another such as the corner of a room where two walls are joined at 90 degrees. A nearly smooth edge is one in which the rate of change of surface position or orientation changes suddenly but by a negligible amount, from one side of the edge to the other. For example, a mesh model is not a smooth surface model since there are generally many sharp edges where the mesh faces join.

Figure 1:
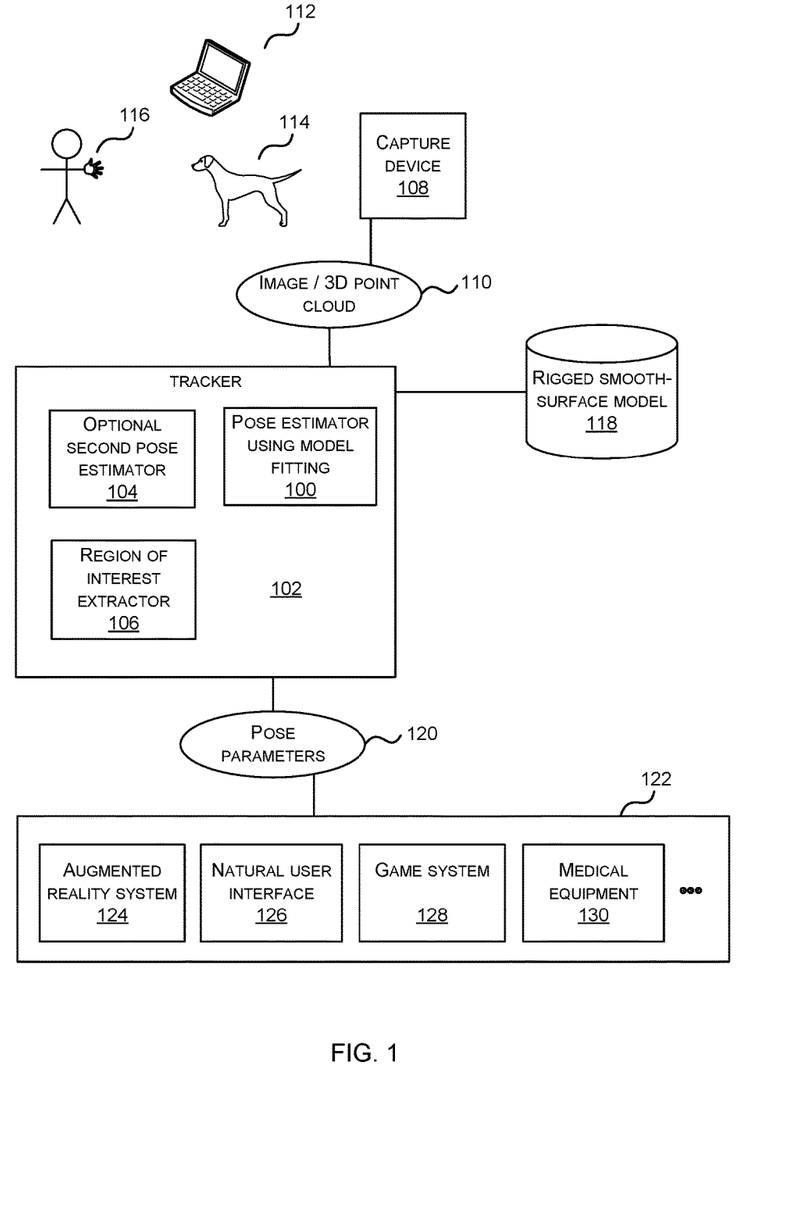
FIG. 1 is a schematic diagram of a tracker which computes pose parameters of an articulated object.

FIG. 1 is a schematic diagram of a tracker which computes pose parameters of an articulated object. The pose parameters comprise a global location and global orientation of the object as well as positions of one or more joints of the object.

A capture device 108 such as a color camera, depth camera, a sensor which captures three dimensional (3D) point clouds, or other type of sensor captures data depicting the articulated object in an environment. In the example of FIG. 1 the articulated object is shown as a human hand 116, a laptop computer 112, or a dog 114 but any other articulated object may be used. The captured data such as an image or 3D point cloud 110 is input to a tracker 102 using a wired or wireless link, over a communications network or in other ways.

The tracker 102 is computer implemented for example in a mobile phone, in a personal computer, in a game system, in medical equipment or in other apparatus depending on the application domain concerned. The tracker 102 has access, over a wired or wireless communications link over a network, or from a memory at the tracker itself, to a store holding a rigged smooth-surface model 118 of the object. For example, the rigged smooth-surface model 118 is stored at the mobile phone, medical equipment, game system or other device. The rigged smooth-surface model 118 is stored at a remote location accessible to the tracker 102 over a communications network, in some examples. The tracker has an input such as a wireless receiver, a wired communications port or other input to a computing device, which receives captured sensor data from the capture device 108. The capture device 108 sends the captured sensor data to the tracker over a network in some examples. The tracker receives captured sensor data from more than one capture device in some examples. The sensor data received at the tracker is stored in a memory of the tracker such as the memory described later in this document.

The tracker computes values of pose parameters 120 of the rigged smooth-surface model 118 which fit the captured data 110. The tracker is able to do this for a single instance of the captured data 110. In some examples the tracker computes a stream of values of the pose parameters 120 as a stream of captured data 110 is input to the tracker 102. In this way the tracker 102 follows pose of the articulated object as it moves and/or as the capture device 108 moves. The computed values of the pose parameters 120 are input to one or more downstream apparatus 122 such as an augmented reality system 124, a natural user interface 126, a game system 128, medical equipment 130 or others.

The tracker itself comprises a pose estimator which uses model fitting 100, an optional second pose estimator 104 using another type of tracking technology, and optionally a region of interest extractor 106.

In some examples, the functionality of the tracker 102 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
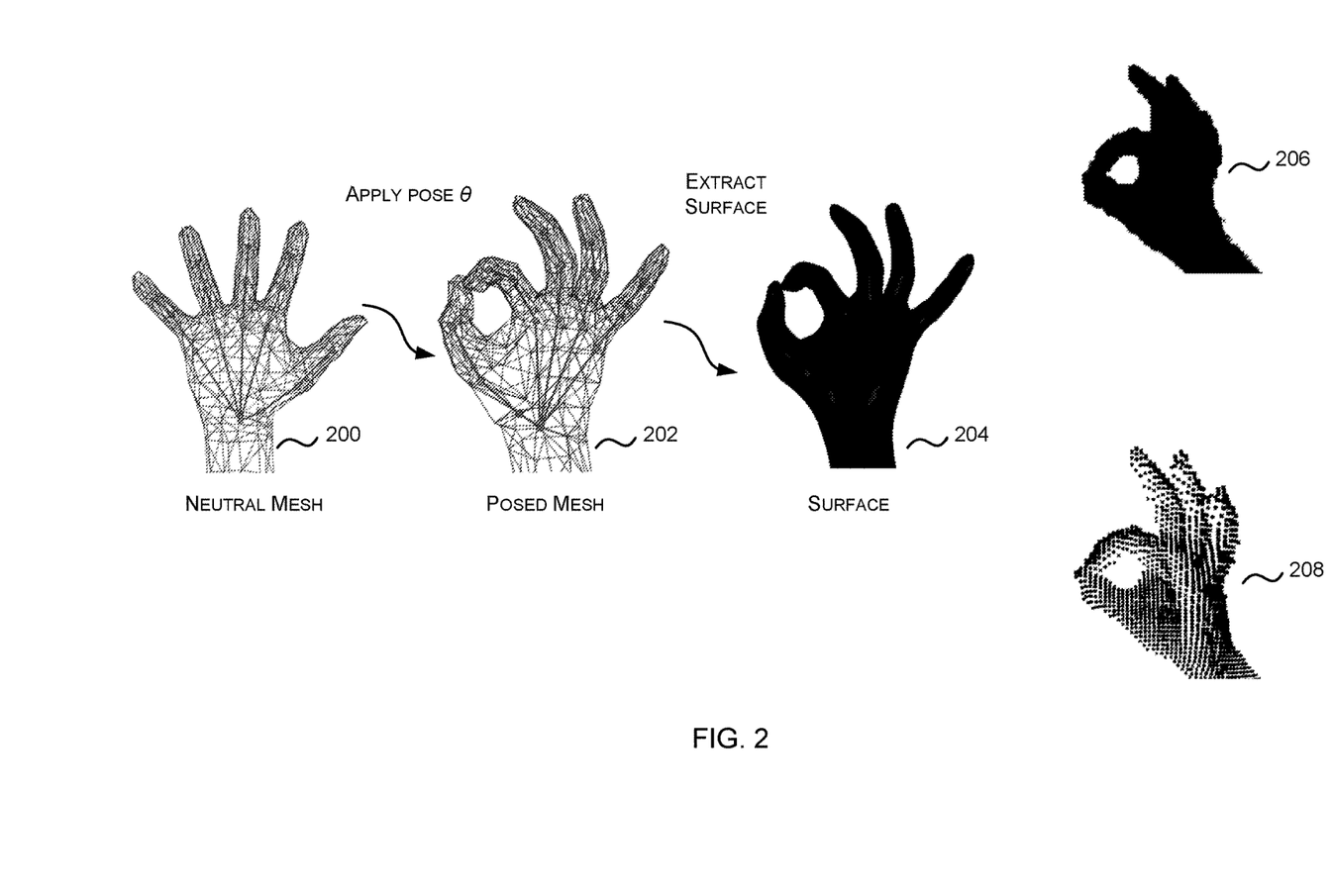
FIG. 2 is a schematic diagram of a neutral mesh model of a human hand, a posed mesh of a human hand, a smooth surface model of a human hand, a depth image and a point cloud.

FIG. 2 is a schematic diagram of a neutral mesh model 200 of a human hand, a posed mesh model 202 of a human hand, a smooth surface model 204 of a human hand, a depth image 206 and a point cloud 208. This example of a mesh model 200, 202 is shown to illustrate the difference between a mesh model 200, 202 and a smooth-surface model 204.

In the example of FIG. 2 the neutral mesh model 200 of a human hand is a triangular mesh which is rigged as it contains a representation of a skeleton. When values of the pose parameters, such as joint positions, of the skeleton are applied to the neutral mesh model 200 a posed mesh model such as 202 is obtained. A smooth surface is computed from a mesh model, such as the posed mesh model 202 to obtain smooth surface 204. The smooth surface is computed in some examples by repeatedly subdividing the faces of the mesh model until in the limit, a smooth surface is obtained, referred to as the limit surface. Other ways of computing a smooth surface are available. For example, closed-form solutions may be used to evaluate a point on the limit surface or a closely related approximation so that in practice it is not essential to subdivide the faces of the mesh model infinitely.

FIG. 2 shows a depth image of a human hand to illustrate the situation where the captured data 110 comprises a depth image. A depth image is a two dimensional (2D) array where each entry comprises a distance value which is a distance from the camera to a surface in the scene depicted in the depth image. A point cloud is an array where each entry comprises a three dimensional (3D) coordinate of a surface point in the scene depicted in the image. The depth image is back-projected to compute a 3D point cloud 208 using knowledge of the camera. In some examples the 3D point cloud is captured by a scanning sensor rather than by back projecting from a depth image.

Figure 3:
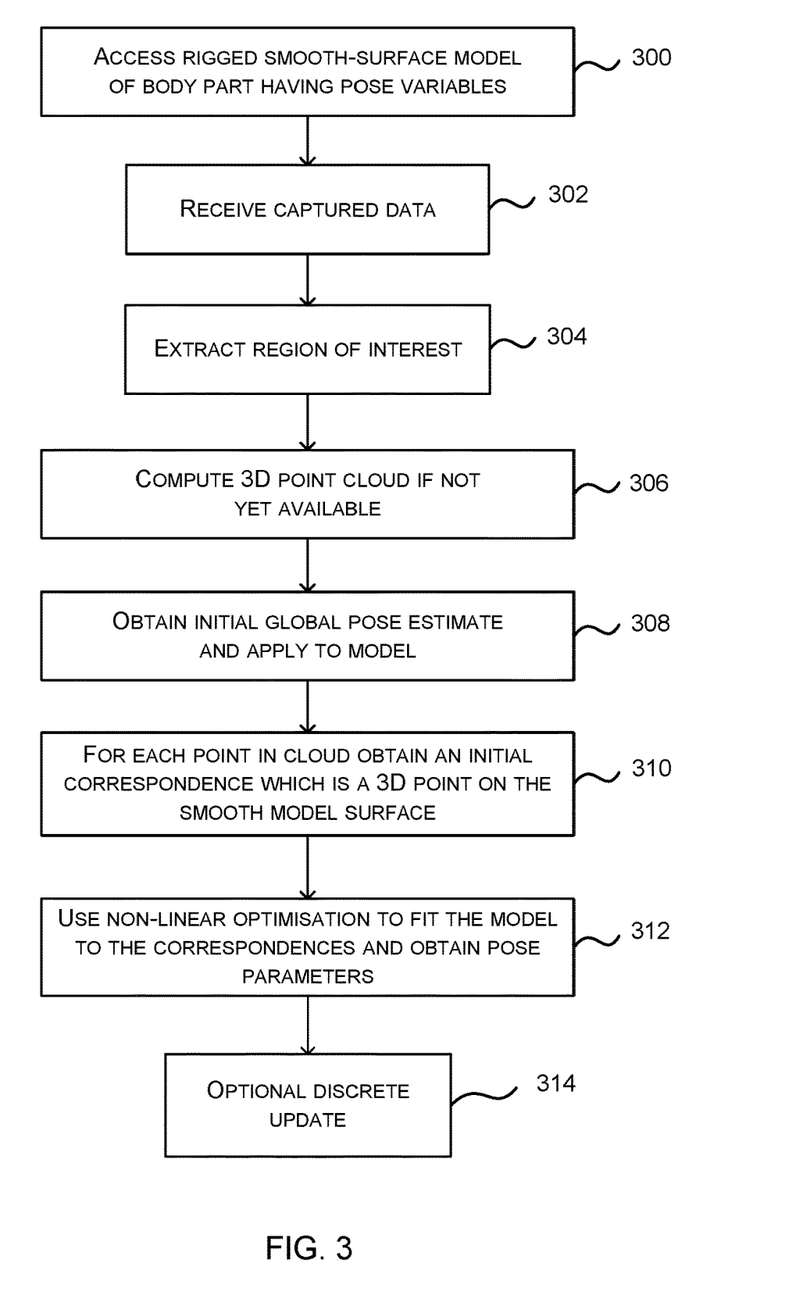
FIG. 3 is a flow diagram of an example method of operation at the tracker of FIG. 1.

FIG. 3 is a flow diagram of an example method of operation at the tracker of FIG. 1. The tracker accesses 300 the rigged smooth-surface model of the articulated object. For example, in the case that the aim is to track a laptop computer the tracker accesses 300 a rigged smooth-surface model of a generic laptop.

The tracker receives captured data 302 depicting the object to be tracked. For example, the captured data 302 is a 3D point cloud, a depth map, one or more frames of raw time of flight data, color image data or other captured data depicting the object to be tracked. Optionally the tracker extracts 304 a region of interest from the captured data where the region of interest depicts the object to be tracked rather than other parts of the scene or environment in which the object is present. For example, the tracker uses machine learning technology or image analysis to extract a region of interest of the captured data depicting the object to be tracked. The region of interest may or may not be contiguous.

In some examples, where the region of interest comprises parts of a depth map, the tracker computes 306 a 3D point cloud by back projecting the region of interest. In some cases a 3D point cloud is already available. In some cases no 3D point cloud is used.

Optionally the tracker obtains 308 an initial pose estimate and applies it to the model. For example, by using a value of the pose computed for a previous instance of the captured data 110. For example, by recording a series of values of the pose computed by the tracker and extrapolating the series to compute a predicted future value of the pose. For example, by selecting a value of the pose at random. For example, by selecting a value of the pose using output of a machine learning algorithm.

Optionally the tracker obtains 310 initial correspondence estimates. A correspondence estimate is an indication of a 3D point on the surface of the smooth-surface model corresponding to a captured data point.

In some examples a correspondence is a tuple of values denoted by the symbol u in this document, which specifies a point on the smooth-surface model. The smooth surface itself is 2D and so point u acts in a similar way to a 2D coordinate on that surface. A defining function S is stored at the tracker in some examples and is a function which takes as its input a correspondence u and the pose parameters. The defining function S computes a 3D position in the world that point u on the smooth-surface model corresponds to.

The tracker obtains 310 a plurality of initial correspondence estimates, for example, one for each point in the point cloud, or one for each of a plurality of captured data points. The tracker obtains 310 the initial correspondence estimates by selecting them at random or by using machine learning, or by choosing a closest point on the model given the initial estimate of the global pose, using combinations of one or more of these approaches, or in other ways. In the case that machine learning is used a machine learning system has been trained using a large amount of training data to derive a direct transformation from image data to 3D model points.

The tracker computes an optimization 312 to fit the model to the captured data. For example, the tracker computes the following minimization beginning from the initial values of the correspondence estimates and the pose parameters where these are available (or beginning from randomly selected values)

$$\min_{\theta, u_1, \ldots, u_n} \sum_{i=1}^{n} \psi(\|x_i - S(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D smooth model surface point $S(u_i; θ)$. Where the robust kernel ψ(.) is a Geman-McClure kernel, a Huber kernel, a Quadratic kernel or other kernel.

The optimization enables correspondence estimation and model fitting to be unified since the minimization searches over possible values of the correspondences u and over possible values of the pose parameters θ. This is found to give better results than an alternative approach of using alternating stages of model fitting and correspondence estimation.

The optimization is non-linear in some examples. The result of the optimization is a set of values of the pose parameters θ including the global pose parameters and the joint positions.

Because the model has a smooth surface it is possible to compute the optimization using a non-linear optimization process. For example, a gradient-based process which exploits the fact that rate of change of both surface position and surface orientation does not change substantially across edges in a smooth surface. Jacobian optimization methods are used in some examples. This improves speed of processing. It is expected that such an approach (using a smooth-surfaced model and a non-linear optimization) would not work and/or would give inaccurate results. Despite this it has unexpectedly been found that this approach enables accurate results to be obtained whilst maintaining the improved speed of processing. FIGS. 4 to 7 show graphs of results of empirical tests which demonstrate the accuracy of performance of the tracker.

A discrete update operation is optionally used together with the optimization. This involves using the continuous optimization as mentioned above to update both the pose and the correspondences together, and then using a discrete update to re-set the values of the correspondences using the captured sensor data. The discrete update allows the correspondences to jump efficiently from one part of the object surface to another, for example, from one finger-tip to the next.

The process of FIG. 3 is optionally repeated, for example as new captured data arrives as part of a stream of captured data. In some examples the process of FIG. 3 is arranged to include reinitialization whereby the pose parameters used at the beginning of the optimization are obtained from another source such as the second pose estimator 104. For example, using global positioning sensor data, using another tracker which is independent of the tracker of FIG. 1, using random values or in other ways. Reinitialization occurs according to various criteria such as at specified time intervals, at specified intervals of instances of captured data, according to user input, according to error metrics which indicate error in the pose values or in other ways. Reinitialization using an independent tracker is found to give good results.

Figure 4:
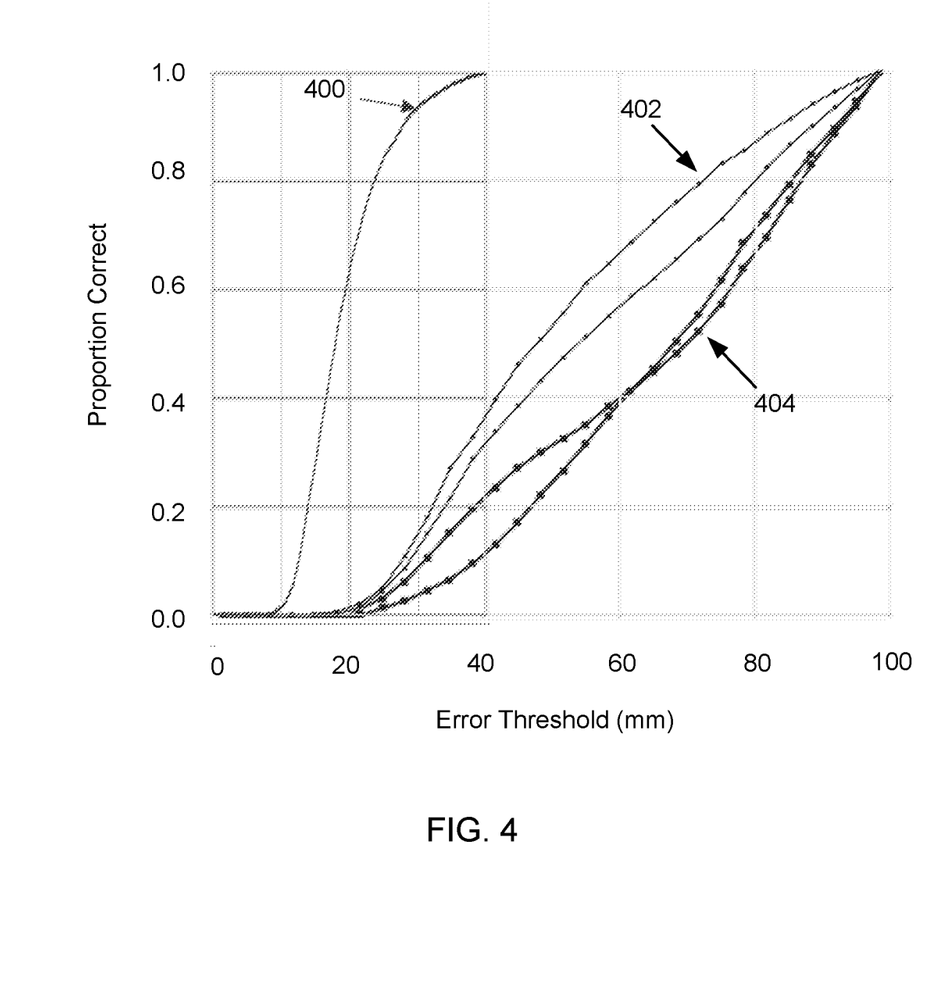
FIG. 4 is a graph of proportion correct against error threshold for the tracker of the present technology and some other types of tracker.

During empirical testing of the tracker 102 labeled data sets were used. For example, captured data 110 labeled with ground truth smooth-surface model points. FIG. 4 is a graph of proportion correct against error threshold in millimeters. Proportion correct is the proportion of captured data points computed by the tracker to have corresponding model points within a certain error threshold distance (in mm) from the ground truth data. As the error threshold increases the proportion correct is expected to go up. Results for the tracker of the present technology are shown in line 400 of FIG. 4. It is seen that the results for the present technology are much more accurate than trackers with results shown in lines 402, 404 of FIG. 4 which do not unify correspondence estimation and model fitting in the same way as described herein.

As mentioned above, the tracker of the present technology computes the pose parameters with improved speed. Rendering approach trackers, using specialist graphics processing units, are found to take around 100 msecs to compute pose parameters from captured data. The present technology is able to compute pose parameters from captured data in 30 msecs using a standard central processing unit (CPU). Rendering approach trackers render an image from a 3D model and compare the rendered image to captured data. This consumes large amounts of computer power, for example requiring hundreds of watts of graphics processing unit (GPU) and CPU power and so is impractical for mobile devices.

Figure 5:
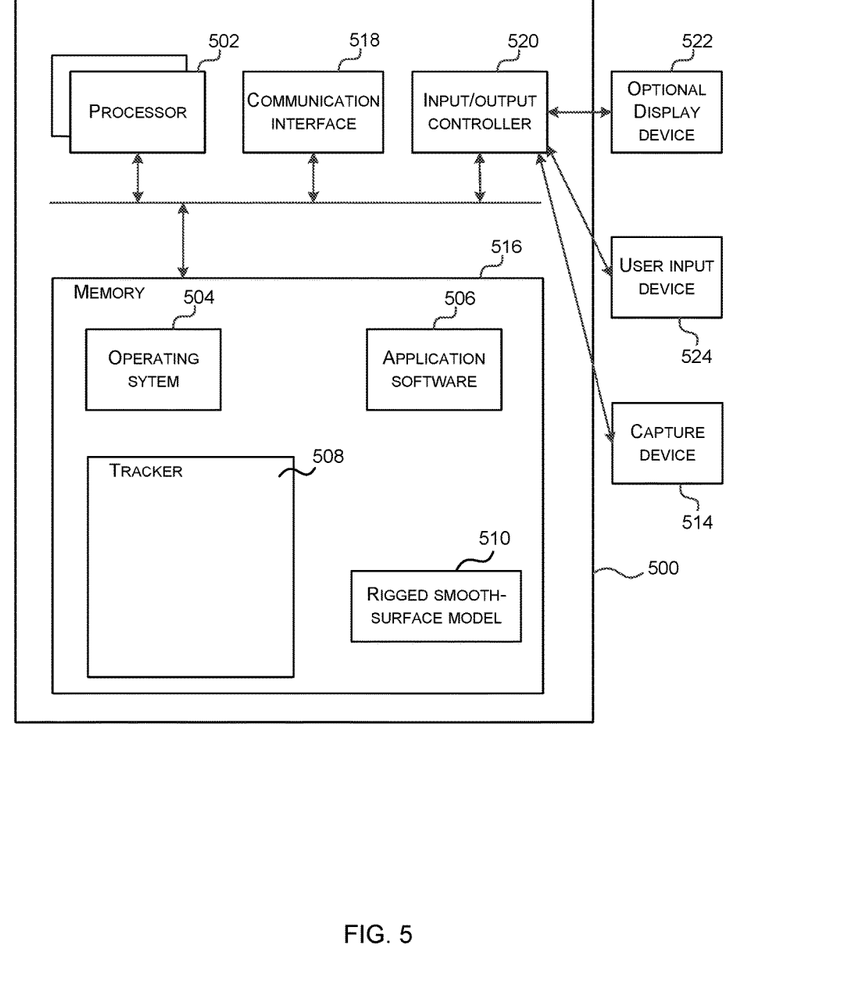
FIG. 5 illustrates an exemplary computing-based device in which embodiments of an articulated object tracker are implemented.

FIG. 5 illustrates various components of an exemplary computing-based device 500 which is implemented as any form of a computing and/or electronic device, and in which embodiments of a tracker such as tracker 102 of FIG. 1 is implemented.

Computing-based device 500 comprises one or more processors 502 which are microprocessors, controllers or any other suitable type of processors for processing computer executable instructions to control the operation of the device in order to compute values of pose parameters, including global pose parameters and joint positions, of articulated objects. In some examples, for example where a system on a chip architecture is used, the processors 502 include one or more fixed function blocks (also referred to as accelerators) which implement a part of the method of computing values of pose parameters in hardware (rather than software or firmware). Platform software comprising an operating system 504 or any other suitable platform software is provided at the computing-based device to enable application software 506 to be executed on the device.

The computer executable instructions are provided using any computer-readable media that is accessible by computing based device 500. Computer-readable media includes, for example, computer storage media such as memory 516 and communications media. Computer storage media, such as memory 516, includes volatile and non-volatile, removable and non-removable media implemented in any method or technology for storage of information such as computer readable instructions, data structures, program modules or other data. Computer storage media includes, but is not limited to, random access memory (RAM), read-only memory (ROM), erasable programmable read only memory (EPROM), electrically erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is usable to store information for access by a computing device. In contrast, communication media embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 516) is shown within the computing-based device 500 it will be appreciated that the storage is optionally distributed or located remotely and accessed via a network or other communication link (e.g. using communication interface 518).

The computing-based device 500 also comprises an input/output controller 520 arranged to output display information to a display device 522 which is separate from or integral to the computing-based device 500. The display information provides a graphical user interface for example, to display a representation of the tracked object. The input/output controller 520 comprises an input configured to receive and process input from one or more devices, such as a user input device 524 (e.g. a mouse, keyboard, camera, microphone or other sensor) display device 522 and capture device 514. The input is any type of input able to receive sensor data from the capture device 514 such as a wired communications port, a wireless communications receiver, a digital versatile disc drive, a universal serial bus (USB) port, or other input. In some examples the user input device 524 detects voice input, user gestures or other user actions and provides a natural user interface (NUI). This user input is used to trigger operation of the tracker, to input rigged smooth-surface models, to view results and for other reasons. In an embodiment the display device 522 also acts as the user input device 524 if it is a touch sensitive display device. The input/output controller 520 also outputs data to devices other than the display device, e.g. a locally connected printing device.

Any of the input/output controller 520, display device 522 and the user input device 524 comprise NUI technology which enables a user to interact with the computing-based device in a natural manner, free from artificial constraints imposed by input devices such as mice, keyboards, remote controls and the like. Examples of NUI technology that are optionally provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (electro encephalogram (EEG) and related methods).

Examples provide a tracker comprising:

an input configured to receive captured sensor data depicting an object;

a processor configured to access a rigged, smooth-surface model of the object;

the processor configured to compute values of pose parameters of the model by calculating an optimization to fit the model to data related to the captured sensor data, where variables representing correspondences between the data and the model are included in the optimization jointly with the pose parameters.

For example, the processor is configured to use a gradient-based optimization process to calculate the optimization.

For example, the pose parameters comprise global pose parameters and one or more joint positions.

For example, the captured sensor data comprises a depth image and the processor is configured to back project the depth image to compute a 3D point cloud.

For example, the processor is arranged to extract a region of interest from the captured sensor data, and to use the region of interest and not the rest of the captured sensor data during the optimization.

For example, the processor is arranged to obtain initial values of the variables representing correspondences from a trained machine learning system and to begin the optimization using the initial values.

For example, the processor is arranged to obtain initial values of the variables representing correspondences by choosing, for individual points of the captured sensor data, a closest point on the model, and to begin the optimization using the initial values.

For example, the processor is arranged to obtain initial values of the variables representing correspondences by random selection and to begin the optimization using the initial values.

For example, the processor is arranged to obtain initial values of global pose parameters which are part of the pose parameters, either from a trained machine learning system or from previous values of the pose parameters, and to begin the optimization using the initial values of the global pose parameters.

For example, the variables representing the correspondences are values specifying point on to the rigged smooth-surface model.

For example, the tracker comprises a defining function which generates a 3D world point corresponding to a value of a correspondence variable.

For example, the rigged smooth-surface model comprises a surface defined by repeatedly subdividing the mesh model.

The tracker, in some examples, is arranged to repeatedly compute the optimization for instances of the captured sensor data, and to reinitialize the optimization using data from another source.

The tracker is arranged, in some examples, to reinitialize the optimization using data from an independent tracker.

In various examples there is a tracker comprising:

an input configured to receive captured sensor data depicting an object;

a processor configured to access a rigged, smooth-surface model of the object;

the processor configured to compute values of pose parameters of the model by using non-linear optimization to fit the model to data related to the captured sensor data, where variables representing correspondences between the data and the model are included in the optimization jointly with the pose parameters.

In various examples there is a computer-implemented method comprising:

receiving captured sensor data depicting an object;

accessing a rigged, smooth-surface model of the object;

computing, at a processor, values of pose parameters of the model by calculating an optimization to fit the model to data related to the captured sensor data, where variables representing correspondences between the data and the model are included in the optimization jointly with the pose parameters.

The method comprises, in some examples, obtaining initial values of the variables representing correspondences from a trained machine learning system and beginning the optimization using the initial values.

In some examples the variables representing the correspondences are values specifying a point on the rigged smooth-surface model.

In some examples the method comprises using a defining function which generates a 3D world point corresponding to a value of a correspondence variable.

In some examples the rigged smooth-surface model comprises a surface defined by repeatedly subdividing a mesh model of the object.

In examples there is an apparatus comprising:

means for receiving captured sensor data depicting an object;

means for accessing a rigged, smooth-surface model of the object;

means for computing, at a processor, values of pose parameters of the model by calculating an optimization to fit the model to data related to the captured sensor data, where variables representing correspondences between the data and the model are included in the optimization jointly with the pose parameters. For example the means for receiving captured sensor data is an input of a computing device such as a wireless communications receiver, a wired communications port or other input. For example, the means for accessing the rigged smooth-surface model is an input of a computing device, or a memory of a computing device storing the model. For example, the means for computing is a processor of a computing device.

The term 'computer' or 'computing-based device' is used herein to refer to any device with processing capability such that it is able to execute instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants and many other devices.

The methods described herein are optionally performed by software in machine readable form on a tangible storage medium e.g. in the form of a computer program comprising computer program code means adapted to perform all the operations of any of the methods described herein when the program is run on a computer and where the computer program is embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations are carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are distributed across a network in some examples. For example, a remote computer stores an example of the process described as software. A local or terminal computer is able to access the remote computer and download a part or all of the software to run the program. Alternatively, the local computer is able to download pieces of the software as needed, or execute some software instructions at the local terminal and some at the remote computer (or computer network). Those skilled in the art will also realize that by utilizing conventional techniques known to those skilled in the art that all, or a portion of the software instructions are optionally carried out by a dedicated circuit, such as a digital signal processor (DSP), programmable logic array, or the like.

Any range or device value given herein is optionally extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above relate to one embodiment or relate to several embodiments. The embodiments are not limited to those that solve any or all of the stated problems or those that have any or all of the stated benefits and advantages. It will further be understood that reference to 'an' item refers to one or more of those items.

The operations of the methods described herein are carried out in any suitable order, or simultaneously where appropriate. Additionally, individual blocks are optionally deleted from any of the methods without departing from the spirit and scope of the subject matter described herein. Aspects of any of the examples described above are combinable with aspects of any of the other examples described to form further examples without losing the effect sought.

The term 'comprising' is used herein to mean including the method blocks or elements identified, but that such blocks or elements do not comprise an exclusive list and a method or apparatus optionally contains additional blocks or elements.

It will be understood that the above description is given by way of example only and that various modifications are optionally made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A tracker comprising:
an input controller configured to receive captured sensor data depicting an object; and
a processor configured to access a rigged, smooth-surface model of the object;
the processor configured to compute values of pose parameters of the model by calculating an optimization to fit the model to data related to the captured sensor data, where variables representing correspondences between the data and the model are included in the optimization jointly with the pose parameters; and
the processor further configured to repeatedly compute the optimization for instances of the captured sensor data, and to reinitialize the optimization using data from another source.

2. The tracker of claim 1 where the processor is configured to use a gradient-based optimization process to calculate the optimization.

3. The tracker of claim 1 where the pose parameters comprise global pose parameters and one or more joint positions.

4. The tracker of claim 1 where the captured sensor data comprises a depth image and the processor is configured to back project the depth image to compute a three dimensional point cloud.

5. The tracker of claim 1 where the processor is arranged to extract a region of interest from the captured sensor data, and to use the region of interest and not the rest of the captured sensor data during the optimization.

6. The tracker of claim 1 where the processor is arranged to obtain initial values of the variables representing correspondences from a trained machine learning system and to begin the optimization using the initial values.

7. The tracker of claim 1 where the processor is arranged to obtain initial values of the variables representing correspondences by choosing, for individual points of the captured sensor data, a closest point on the model, and to begin the optimization using the initial values.

8. The tracker of claim 1 where the processor is arranged to obtain initial values of the variables representing correspondences by random selection and to begin the optimization using the initial values.

9. The tracker of claim 1 where the processor is arranged to obtain initial values of global pose parameters which are part of the pose parameters, either from a trained machine learning system or from previous values of the pose parameters, and to begin the optimization using the initial values of the global pose parameters.

10. The tracker of claim 1 where the variables representing the correspondences are values specifying a point on the rigged smooth-surface model.

11. The tracker of claim 10 where the tracker comprises a defining function which generates a three dimensional world point corresponding to a value of a correspondence variable.

12. The tracker of claim 1 where the rigged smooth-surface model comprises a surface defined by repeatedly subdividing a mesh model.

13. The tracker of claim 1 which is arranged to reinitialize the optimization using data from an independent tracker.

14. A tracker comprising:
an input controller configured to receive captured sensor data depicting an object and
a processor configured to access a rigged, smooth-surface model of the object;
the processor configured to compute values of pose parameters of the model by using non-linear optimization to fit the model to data related to the captured sensor data, where variables representing correspondences between the data and the model are included in the optimization jointly with the pose parameters; and
the processor further configured to repeatedly compute the optimization for instances of the captured sensor data, and to reinitialize the optimization using data from another source.

15. A computer-implemented method comprising:
receiving captured sensor data depicting an object;
accessing a rigged, smooth-surface model of the object; and
computing, at a processor, values of pose parameters of the model by calculating an optimization to fit the model to data related to the captured sensor data, where variables representing correspondences between the data and the model are included in the optimization jointly with the pose parameters; and
computing, repeatedly, the optimization for instances of the captured sensor data, and reinitializing the optimization using data from another source.

16. The method of claim 15 comprising obtaining initial values of the variables representing correspondences from a trained machine learning system and beginning the optimization using the initial values.

17. The method of claim 15 where the variables representing the correspondences are values specifying a point on the rigged smooth-surface model.

18. The method of claim 15 comprising using a defining function which generates a three dimensional world point corresponding to a value of a correspondence variable.

19. The method of claim 15 where the rigged smooth-surface model comprises a surface defined by repeatedly subdividing a mesh model of the object.

20. The method of claim 15 further comprising reinitializing, by the processor, the optimization using data from an independent tracker.

* * * * *